Figure 1:
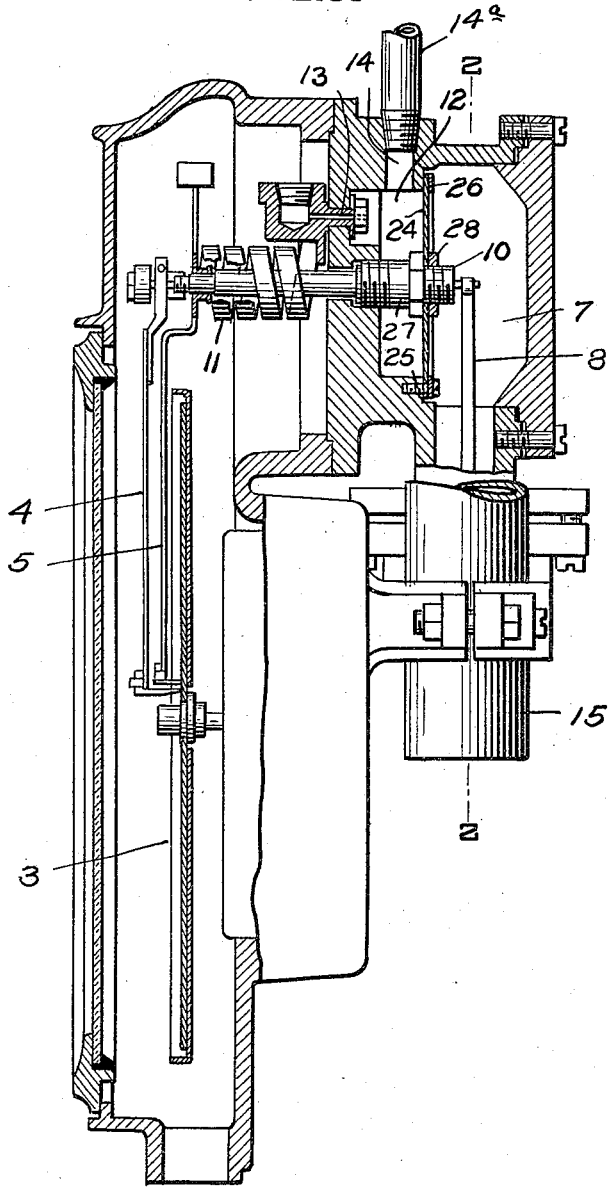

Sept. 16, 1924.

T. H. KERR

INDICATING METER

Filed Jan. 14, 1922     2 Sheets-Sheet 1

1,509,065

WITNESSES
J. Herbert Bradley.

INVENTOR
Thomas H. Kerr
By Green and McCallister
His Attorneys

Sept. 16, 1924.                                           1,509,065
                          T. H. KERR
                       INDICATING METER
                    Filed Jan. 14, 1922        2 Sheets-Sheet 2

WITNESSES                                        INVENTOR
J. Herbert Bradley.                           Thomas H. Kerr
                                           By Green and McCallister
                                                  His Attorneys Patented Sept. 16, 1924.

1,509,065

UNITED STATES PATENT OFFICE.

THOMAS H. KERR, OF COLUMBUS, OHIO.

INDICATING METER.

Application filed January 14, 1922. Serial No. 529,239.

*To all whom it may concern:*

Be it known that I, THOMAS H. KERR, a citizen of the United States, and a resident of Columbus, in the county of Franklin and State of Ohio, have made a new and useful invention in Indicating Meters, of which the following is a specification.

This invention relates to differential meters, in which mercury or other liquid is employed for indicating variations in the pressure conditions of the metered fluid.

An object of this invention is to produce improved means for retaining the mercury or other pressure responsive liquid in the chamber or passages provided for it and for preventing it from contacting with portions of the meter or metering apparatus which will be damaged by such contact.

Another object is to produce means in such meters which will stabilize the indicator points and prevent chatter which is noticeable and objectionable in meters.

These and other objects, which will be made more apparent throughout the further description of the invention, are attained by means of apparatus embodying the features herein described and illustrated in the drawings accompanying and forming a part hereof.

Figure 2:
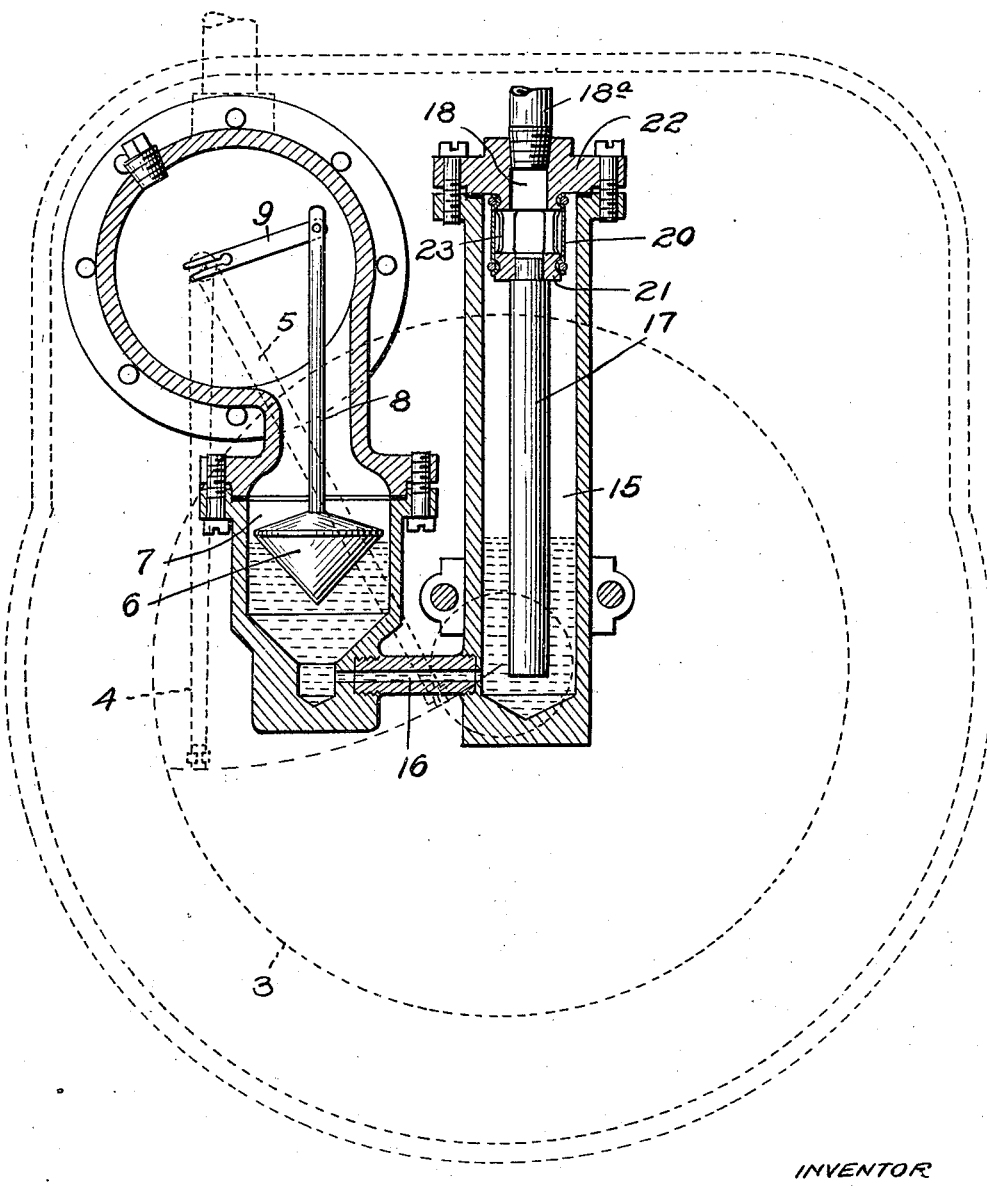

In the drawings, Figure 1 is a vertical sectional view of a differential and static meter embodying my invention. Figure 2 is a sectional view along the line 2—2 of Fig. 1.

In the ordinary form of differential meters, the mercury or pressure-responsive liquid is usually contained in a float chamber, a calibrating chamber and a connecting passage between the chambers. Special provision is made for sealing these chambers during shipment of the meters and also for preventing the liquid being blown out of the chambers by pulsations in the pressure of the metered fluid.

Such means are usually expensive and they are ordinarily ineffective, particularly in preventing displacement of the liquid in response to fluctuations in fluid pressure. My invention consists in providing improved means for retaining the liquid in the chambers and passages provided for it.

In the drawings, I have shown a meter having the usual rotary dial 3 and the usual dial marking pens 4 and 5. As indicated, the pen 4 is actuated by means of a float 6 located in a float chamber 7, through the agency of the float stem 8, an arm 9, and a spindle 10. The pen 5 is actuated by means of a coiled tubular member 11 which functions as a Bourdon tube. As shown, the interior of the tube 11 communicates with a pressure chamber 12 through a passage 13 and the static pressure of the fluid to be metered is delivered to the chamber 12 through port 14 and a communicating pipe 14$^a$. In operation, the tube 11 tends to uncoil in response to an increase in pressure within the chamber 12 and to return to its normal position in response to a decrease in pressure within the chamber; consequently, the pen 5 is moved in response to varying pressure within the chamber 12.

The float chamber 7 is of the usual form and communicates with a calibrating chamber 15 through a passage 16. The usual calibrating rod 17 extends downwardly into the chamber 15 and the chambers 7 and 15 are partially filled with mercury or other suitable liquid. The differential pressure occasioned by the flow of the metered fluid through an orifice, a Pitot tube, or a venturi is delivered to the calibrating chamber through a port 18 and a communicating pipe 18$^a$.

In order to prevent the escape of liquid from the calibrating chamber through the port 18 and at the same time provide means for transmitting the fluid pressure from the port to the interior of the calibrating chamber, I employ gas pervious diaphragm 20 which intervenes between the port 18 and the interior of the chamber 15 but is so located and arranged within the chamber that the fluid pressure quickly equalizes on both sides of it. As shown, I provide a diaphragm support 21 which is integrally formed with a cover 22 for the chamber 15. The inlet port 18 extends through the cover 22 and the support 21 is preferably held in place by means of spacers 23 located around the port 18 and so spaced as to provide a free and adequate passage from the port to the diaphragm. The diaphragm is preferably formed of chamois skin and is cylindrical, the lower edge being suitably secured to the support 21 and the upper edge being suitably secured to a circular flange or shoulder surrounding the inlet port 18.

It is desirable for the float chamber 7 to be in open and free communication with the chamber or the inlet port 14 in order that the surface of the mercury or liquid contained in the float chamber will be subjected to the fluid pressure transmitted through the port 14. It is also necessary to prevent mercury from being blown out through the port 14 or into the tubular member 11 since that member is ordinarily formed of metal which is readily attacked by mercury. In order to prevent fluctuations in pressure of the metered fluid from blowing mercury from the float chamber into the tubular spring 11 or out through the port 14 I employ a diaphragm 24 between the chamber 7 and the chamber 12 which is of such material and is so located and arranged that the fluid pressures on opposite sides of it are maintained equal independently of pulsations in the metered fluid.

As shown, I employ a flat circular chamois skin diaphragm, the outer edge of which is secured to a circular shoulder 25 formed on the meter casing by means of a ring 26. The diaphragm 24 is perforated at the center and its inner edge is secured in place around the tubular bearing 27 by means of a hexagonal collar formed on the bearing and a clamping nut 28 threaded on to the bearing. With this arrangement the diaphragm forms an effective seal which prevents the loss of mercury from the float chamber but at the same time insures immediate equalization of fluid pressure in the chambers 7 and 12.

A meter embodying my invention operates the same as ordinary differential meters in that the mercury level within the float chamber varies in response to variations in the differential pressure; that is the difference in fluid pressure delivered to the chambers 15 and 12 and the tubular spring responds to variations in the pressure within the chamber 12.

The mercury is, however, sealed within the chambers 7 and 15 by the diaphragms 24 and 20; consequently, additional means are not necessary for sealing either the float chamber or the calibrating chamber when the meters are being shipped nor is it necessary to provide movable valves or closures to prevent the mercury being blown into the pressure-responsive tubular member 11 by fluctuations in the pressures of the metered fluid.

One advantage of my invention is that it prevents chatter of the indicating or recording arms in response to slight pulsations or pressure.

This is accomplished in apparatus embodying my invention by the gas pervious diaphragms, since while these diaphragms transmit pressure variations of the metered fluid to the pressure responsive liquid and devices, they dampen the pulsations of the liquid and also tend to minimize the surging occasioned by pulsations in the metered fluid.

It will be apparent that impervious diaphragms may be employed which flex in response to pressure variations. While such diaphragms will to a large extent accomplish the advantageous results accomplished by the gas pervious diaphragms, they will introduce the objectionable feature that they move in operation and consequently are subject to wear and more rapid deterioration than the gas pervious stationary diaphragms.

While I have illustrated and described but one embodiment of my invention, it will be apparent that it may be employed with various types of meters and that various changes, additions, modifications and omissions may be made in the apparatus illustrated without departing from the spirit and scope of the invention, as set forth by the appended claims.

I claim as my invention:

1. In combination in a differential meter having a float chamber and a calibrating chamber, each provided with a gas inlet port, a gas pervious diaphragm, dividing the float chamber in two compartments, into one of which the gas inlet port of said chamber opens and the other of which forms the liquid reservoir thereof, a Bourdon tube communicating with said chamber on the gas inlet port side of said diaphragm, a float operating in said liquid reservoir and means actuated by said float, extending through said diaphragm, and a gas pervious diaphragm located in said calibrating chamber, and separating the liquid reservoir portion thereof from the fluid inlet port thereof.

2. In combination in a differential meter, having a float chamber provided with a gas inlet port, a stationary gas pervious diaphragm dividing said chamber into two compartments, into one of which the gas inlet port of said chamber opens and the other of which forms the liquid reservoir thereof, a float located in said liquid reservoir and means operated by the float extending through said diaphragm.

3. In combination in a differential meter having a float chamber provided with a gas inlet port, a stationary gas pervious diaphragm dividing said chamber into two compartments, into one of which said gas inlet port opens and the other of which forms the liquid reservoir of said chamber, pressure responsive means communicating with said chamber on the gas inlet port side of said diaphragm, a float located in said liquid reservoir and means actuated by said float extending through said diaphragm.

In testimony whereof, I have hereunto subscribed my name this 22nd day of December, 1921.

THOMAS H. KERR.